US010713135B2

(12) United States Patent
Zhang et al.

(10) Patent No.: US 10,713,135 B2
(45) Date of Patent: Jul. 14, 2020

(54) DATA DISASTER RECOVERY METHOD, DEVICE AND SYSTEM

(71) Applicant: Tencent Technology (Shenzhen) Company Limited, Shenzhen (CN)

(72) Inventors: Wen Zhang, Shenzhen (CN); Yongfu Sun, Shenzhen (CN); Baiwan Zhu, Shenzhen (CN); Rui Li, Shenzhen (CN); Han Zheng, Shenzhen (CN); Zhigang Hao, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 85 days.

(21) Appl. No.: 16/203,376

(22) Filed: Nov. 28, 2018

(65) Prior Publication Data

US 2019/0095293 A1 Mar. 28, 2019

Related U.S. Application Data

(63) Continuation-in-part of application No. PCT/CN2017/086105, filed on May 26, 2017.

(30) Foreign Application Priority Data

Jul. 27, 2016 (CN) .......................... 2016 1 0603383

(51) Int. Cl.
*G06F 11/00* (2006.01)
*G06F 11/20* (2006.01)
(Continued)

(52) U.S. Cl.
CPC ...... *G06F 11/2082* (2013.01); *G06F 11/0709* (2013.01); *G06F 11/0784* (2013.01);
(Continued)

(58) Field of Classification Search
CPC ............ G06F 11/0709; G06F 11/1458; G06F 11/1471; G06F 11/2056; G06F 11/2064; G06F 11/2069; G06F 11/2082
See application file for complete search history.

(56) References Cited

U.S. PATENT DOCUMENTS 8,301,593 B2   10/2012  Hoffmann et al.
8,689,043 B1 *  4/2014  Bezbaruah .......... G06F 11/2058
                                                  711/162
(Continued)

FOREIGN PATENT DOCUMENTS

CN    101729290 A    6/2010
CN    104679604 A    6/2015
(Continued)

OTHER PUBLICATIONS

Tencent Technology, Written Opinion, PCT/CN2017/086105, dated Jul. 28, 2017, 5 pgs.
(Continued)

*Primary Examiner* — Michael Maskulinski
(74) *Attorney, Agent, or Firm* — Morgan, Lewis & Bockius LLP

(57) ABSTRACT

A data disaster tolerance method, device and system is disclosed. Each node in a logic unit including a single master node and two or more slave nodes is monitored. If the master node is abnormal, the server acquires log information of the plurality of two or more slave nodes separately, the log information of the two or more slave nodes includes respective time points of data synchronization between the slave nodes and the master node A respective slave node of the two or more slave nodes having the time point of data synchronization closest to a current time is selected as a
(Continued)

target node. A master-slave relationship in the logic unit is updated to change a role of the target node to that of the master node.

20 Claims, 7 Drawing Sheets

(51) Int. Cl.
  *G06F 11/07*  (2006.01)
  *G06F 11/14*  (2006.01)
  *H04L 12/24*  (2006.01)
  *H04L 12/26*  (2006.01)

(52) U.S. Cl.
  CPC ...... *G06F 11/1471* (2013.01); *G06F 11/2064* (2013.01); *G06F 11/2069* (2013.01); *H04L 41/069* (2013.01); *H04L 41/0668* (2013.01); *H04L 43/0817* (2013.01)

(56) References Cited

U.S. PATENT DOCUMENTS

| | | | |
|---|---|---|---|
| 2012/0166390 A1* | 6/2012 | Merriman | G06F 11/1458 707/613 |
| 2015/0256383 A1 | 9/2015 | Oh et al. | |
| 2016/0165463 A1 | 6/2016 | Zhang | |
| 2017/0359853 A1* | 12/2017 | Yang | G06F 16/25 |

FOREIGN PATENT DOCUMENTS

| | | |
|---|---|---|
| CN | 104933132 A | 9/2015 |
| CN | 106254100 A | 12/2016 |

OTHER PUBLICATIONS

Tencent Technology, IPRP, PCT/CN2017/086105, Jan. 29, 2019, 6 pgs.
Tencent Technology, ISR, PCT/CN2017/086105, Jul. 28, 2017, 2 pgs.

* cited by examiner

DATA DISASTER RECOVERY METHOD, DEVICE AND SYSTEM

PRIORITY CLAIMS AND RELATED APPLICATIONS

This application is a continuation-in-part application of PCT application number PCT/CN2017/086105, entitled "DATA DISASTER RECOVERY METHOD, APPARATUS AND SYSTEM", filed on May 26, 2017, which claims priority to Chinese Patent Application No. 201610603383.0, entitled "DATA DISASTER RECOVERY METHOD, APPARATUS AND SYSTEM" filed on Jul. 27, 2016, all of which are incorporated by reference in their entirety.

FIELD OF THE TECHNOLOGY

The present application relates to the technical field of communications, and specifically, relates to a data disaster tolerance method, device and system.

BACKGROUND OF THE DISCLOSURE

Data disaster tolerance refers to establishing a data system, so that when a system fails, the security of user data may be ensured, and even uninterrupted application services may be provided.

In a conventional data disaster tolerance solution, the system has at least two devices, one serves as a master and the other serves as a slave. The master provides services to the outside, and the slave serves as a backup of the master, and replaces the master when the master fails. Although this master-slave replication disaster tolerance solution can fulfill the purpose of disaster tolerance to a certain extent, most operations of this solution only support manual switchover. Therefore, when a failure occurs, the master cannot be switched to the slave in time. For this reason, the existing technology proposes a disaster tolerance solution of master-master replication, i.e., two devices are mutually a master and a slave, and when the data transmission in one device changes, data is synchronized to the other device. In this way, the two devices can provide services to the outside at the same time and mirror each other. When one device fails, the service may be directly switched to the other device without operation and maintenance staff intervention.

SUMMARY

The embodiments of the present application provide a data disaster tolerance method, device and system, which not only can achieve the consistency of data before and after master/slave switchover, but also do not need to strictly distinguish devices on a service layer, thereby achieving relatively simple implementation and high system availability.

In one aspect, at a computing system having one or more processors and memory, each node in a logic unit is monitored. The nodes include a single master node and two or more slave nodes. The single master node provides read-write service corresponding to a client-side request received by the server, and the two or more slave nodes server as backup for the single master node. In accordance with a determination that the master node is abnormal, log information of the plurality of two or more slave nodes is separately acquired, the log information of the two or more slave nodes comprising respective time points of data synchronization between the slave nodes and the master node. A respective slave node of the two or more slave nodes having the time point of data synchronization closest to a current time is selected as a target node. A master-slave relationship in the logic unit is updated to change a role of the target node to that of the master node.

According to a second aspect of the present disclosure, a computing system includes one or more processors, memory, a display, a touch-sensitive surface, and a plurality of instructions stored in the memory that, when executed by the one or more processors, cause the computing device to perform the aforementioned method.

According to a third aspect of the present disclosure, a non-transitory computer readable storage medium storing a plurality of instructions configured for execution by a computing system having one or more processors, the plurality of instructions causing the computing device to perform the aforementioned method.

Details of one or more embodiments of the present disclosure are provided in the following accompanying drawings and descriptions. Other features, objectives, and advantages of the present disclosure become clear in the specification, the accompanying drawings, and the claims.

BRIEF DESCRIPTION OF THE DRAWINGS

To describe the technical solutions of the embodiments of the present application more clearly, the following briefly introduces the accompanying drawings required for describing the embodiments. Apparently, the accompanying drawings in the following description show only some embodiments of the present application, and a person skilled in the art may still derive other drawings from these accompanying drawings without creative efforts.

DESCRIPTION OF EMBODIMENTS

Figure 1A:
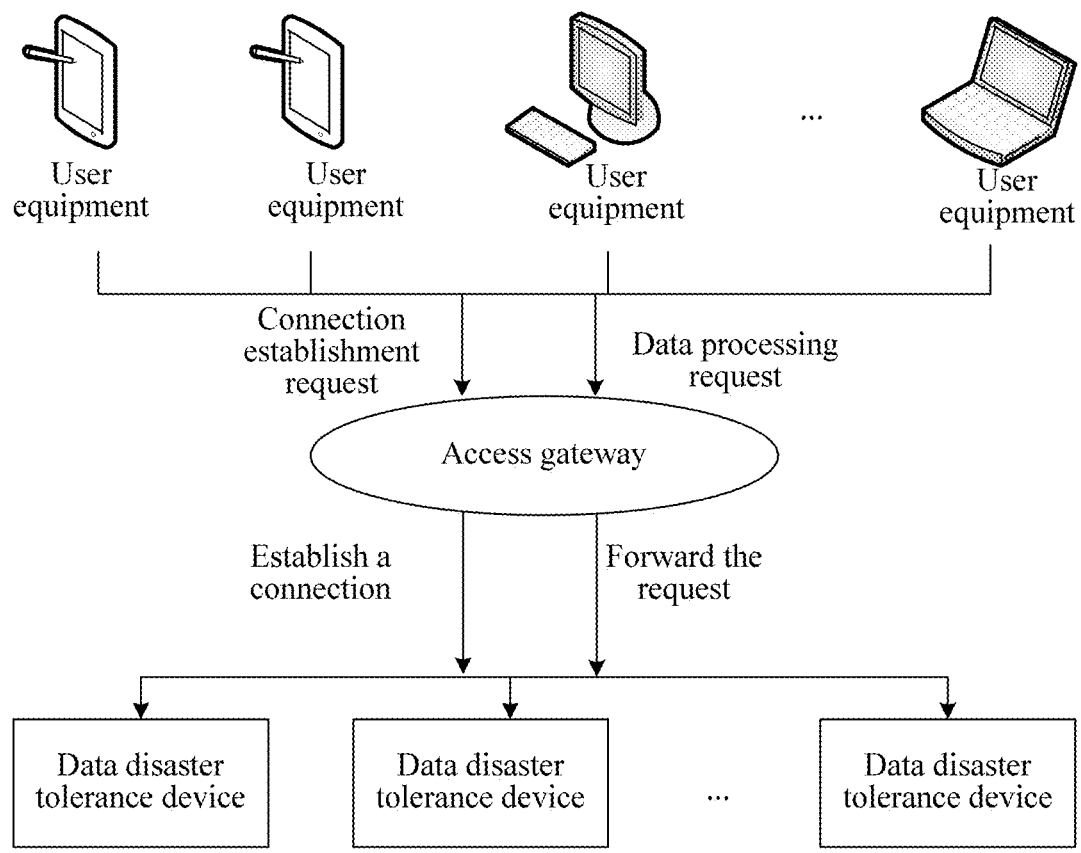
FIG. 1a is a schematic diagram of a scene of a data disaster tolerance system according to an embodiment of the present application.

A clear and complete description will be made to the technical solutions in the embodiments of the present application below in combination with the accompanying drawings in the embodiments of the present application. Apparently, the embodiments described are only part of the embodiments of the present application, not all of them. All other embodiments obtained by those skilled in the art without creative efforts based on the embodiments of the present application shall fall within the protection scope of the present application.

The present disclosure relates to the field of computer data warehouses, and the technical solution provided herein aims at achieving a higher availability that cannot be achieved by a traditional database through a database structure design that is mainly from multiple masters in the conventional master-master replication schemes. The technical solution has innovations in consideration three aspects. First, when the main database fails, it can switch to an available standby database. The switching process guarantees data consistency during the switchover process in seconds. Second, it addresses extreme risks such as earthquakes, flash floods, tsunami, etc. Extreme natural disasters, resulting in the inaccessibility of networks across the entire region, the technical solution provides disaster recovery programs across cities and supports rapid recovery of post-disaster data while minimizing data loss. Thirdly, when a logical error occurs in the data transactions, or if a global disaster occurs in the system and the entire cluster is unavailable, the data needs to be rolled back to a historical version. The architecture supports automatic renewal based on an arbitrary time point and can restore the data to the current date or any time before, and the granularity of the time that can be achieved reaches the seconds' level.

Existing technical solutions include Mysql master-slave replication and Mysql master-master replication, both have drawbacks.

Mysql officially provides a master-slave replication disaster recovery program. There are at least two database instances in the system. One is the Master and the other is the Slave. Only the Master provides external services (e.g., application has write abilities on the master and only read ability on the slaves). The Slave serves as the backup of the Master and replaces the Master when the Master fails. The master-slave replication mechanism of Mysql is that the DDL and DML operations in the master server are transmitted to the Slave server through the binary log, and then the log files are re-executed on the master server, so that the data information on the Slave server and the master server are synchronized. When the Master fails, the Slave can serve as a backup for the Master and can serve as a substitute for the Master.

When the Master cannot provide services, the Slave needs to be manually switched to the master under the master-slave replication scheme. The industry proposes a disaster recovery plan for the master replication. In the master-master replication structure, two servers are master-slave each other, and any one of the above databases will be synchronized to another server. In this way, the two Masters can provide external services at the same time and mirror each other. When one of the Masters goes down, services can be directly switched to another one without the need for operator intervention. For the master-master replication scenario of Mysql, application has write abilities on the masters 1 and 2 and only read ability on the slaves 1 and 2.

The master-slave replication disaster recovery mode of MySQL can reduce the loss caused by Master failure to a certain extent, but when a disaster occurs, it cannot switch to Slave immediately. In addition, manual operation is performed during the switching process, and the availability of the system is greatly challenged.

Mysql master-master replication after a Master down, another Master can still provide services, thus this scheme improves over the availability of master-slave replication to a certain extent, but it requires the business layer to strictly distinguish between the two Master, otherwise, if business layer will freely choose a Master and lead massive primary key conflicts. Therefore, the master-master replication program increases the complexity of programming to a certain degree, and is not easily adopted by enterprises. The maintenance cost of such a system is also high.

In the present disclosure, a Mysql high availability architecture based on a master-slave approach is proposed. The present disclosure addresses the issue of availability and ease of use and implementation issues with the conventional architecture. Disaster recovery, as an important measure of availability, is also considered for different network environments. From the perspective of regionality of the network conditions, it is necessary to distinguish between the disaster tolerance of the cross-data-center and cross-region disaster recovery. For the cross-data-center disaster recovery, because the different equipment rooms are in the same geographical area, the network between the equipment rooms can be connected through dedicated lines. This is a requirement for disaster recovery by server switching to reach the seconds level, and ensure data consistency during the switching process. Cross-regional disaster recovery requires the use of public network bandwidth, which requires a complex network environment. There is always some data that cannot be synchronized due to network delays, and inter-city disaster recovery also needs to ensure data consistency. In the proposed architecture, a TGW (trunk gateway) component is added to the agent layer. When a user accesses the service, he actually accesses the address on the external network access device of the TGW. The TGW forwards the request to the backend according to the vip/vport. At the same time, the TGW provides the load balancing function. When a proxy service is busy or unavailable, the TGW will find a proxy service corresponding to the current requested service that is relatively free.

TGW mainly provides the following functions:

1. When a user creates a new connection, the TGW selects a server based on the weight attributed to the servers (e.g., weights assigned according to their load capacities) and establishes the session information from the user to the selected server. For a user with an existing connection, the request is forwarded to the corresponding server according to the session information of the existing connection. This way, the purpose of load balancing can be achieved by the TGW component located above the agent level.

2. The TGW is the component that saves the connected session information. Thus, the server capacity can easily be expanded at any time, and existing user connections will not be affected.

3. The TGW periodically detects the status of the servers and automatically kicks the failed servers out of the serviceable list within one minute. When TGW detects that the server is back to normal, it automatically adds it back to the serviceable list.

In the architecture proposed herein, each single set is treated as a logical unit, including a master and two slaves. Each set is deployed in different local equipment room, and the nodes (e.g., the master and slave servers) are connected through dedicated lines. The architecture is mainly divided into three modules: Scheduler, Agent, and Proxy. The interactions between modules are accomplished through the open source distributed application coordination service Zookeeper, for example.

Scheduler, as a cluster management and scheduling center, has these main functions:

1, Management each set including a master and two slaves; and facilitate creation, deletion, and switching between nodes (e.g., servers) within a respective set;

2. Monitoring the survival status of each node in a respective set. When the primary node (e.g., the current master) in the set fails, initiating a high consistency master/slave switchover process.

3, Scheduler is responsible for its own disaster recovery through the zk election mechanism to ensure that the central control node (e.g., the scheduler) is not a single node with no backup.

The Agent module is responsible for monitoring the operation of the local Mysql instance. The main functions are as follows:

1. Use a short-term connection to periodically access the Mysql instance of the local machine to detect whether it is readable or writable. If an exception occurs, the abnormal information will be reported to the ZooKeeper, and the abnormal situation will be detected by the above-mentioned ZooKeeper module which will initiating disaster recovery switching;

2. Check the execution status of master/slave replication, and regularly report the delay of master/slave replication and the task identifier of delayed transactions. If a master/slave switchover occurs, the master/slave relationship is automatically re-established to the new master. Therefore, database administrator (DBA) intervention is not required for the Mysql master/slave switching. For newly added instances, xtrabackup is automatically used to automatically rebuild data through the master.

3. Monitor whether there is a disaster recovery switching and perform the master/slave switchover process as planned.

The gateway is developed based on Mysql Proxy and has been optimized at the network layer, connection management, SQL analysis, and routing, etc. The main functions of the gateway are:

1, Watch zk routing information, pull the latest routing table and save it to the local file and memory;

2, Route the SQL requests to a corresponding Set, support read and write separation; and 3. Perform authentication on the accessing IP, username, and password.

The HDFS (Hadoop Distributed File System) cluster is used to support data backup of the system. One set will elect a slave machine to act as a cold node to complete data backup. The backup policy is that binlog writes to the HDFS cluster in real time in the form of a stream pipe, and the mirror image file is backed up once a day. Due to the large amount of data in the mirror image file, the program chooses a random event during the day to backup to avoid peak concurrency in the cluster. When a database fails, the database instance can be restored to the specified time point based on the image of the day and the binlog at the point in time, and the granularity of the recovery time is in seconds.

Figure 1B:
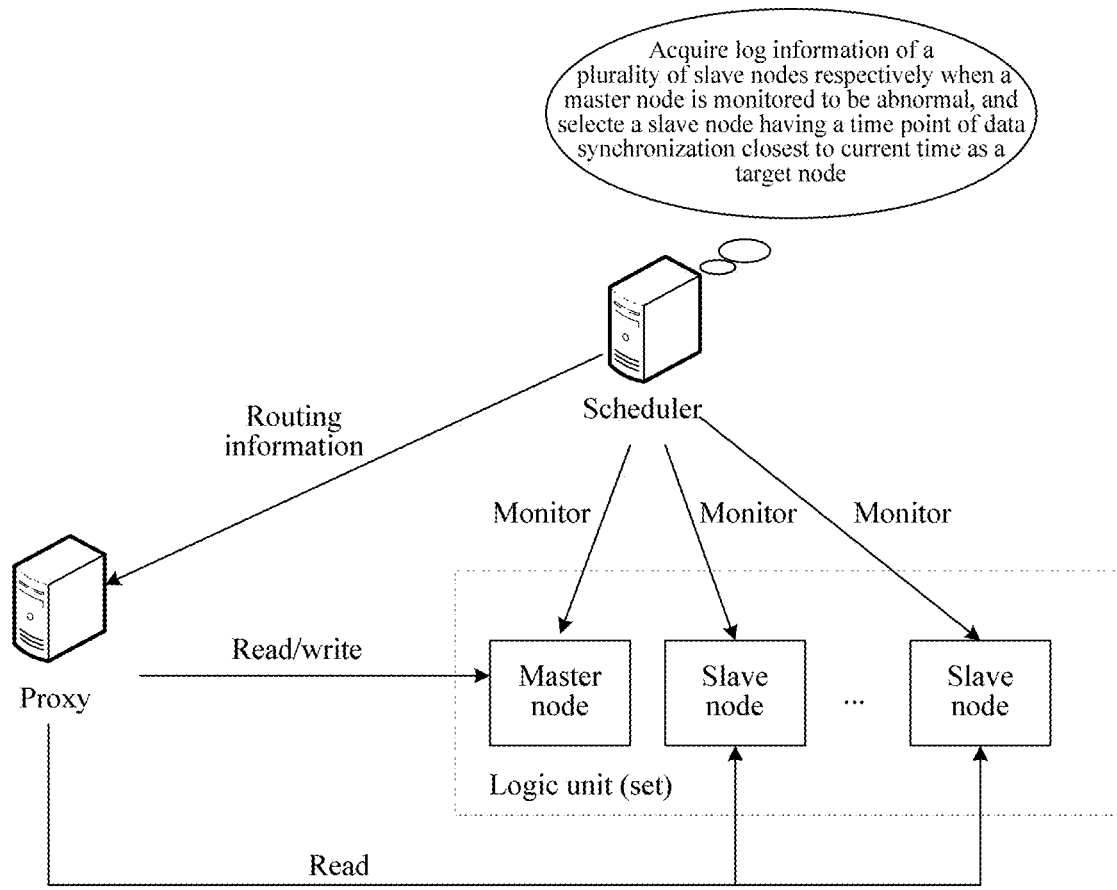
FIG. 1b is a schematic diagram of a scene of a data disaster tolerance method according to an embodiment of the present application.

The Agent acts as a bypass module of the DB. It periodically checks the live state of the DB (3 seconds) and writes the status value to a temporary node of the ZooKeeper. The Scheduler listens to the status information of the node on the ZooKeeper and triggers a switchover process if it finds that the live state is abnormal. In addition, because a temporary node is used for this task, when the agent experiences a core failure, the node will disappear, and the Scheduler will detect the failure of the node and trigger a handover process. The switching process is shown in FIG. 1b and accompanying descriptions.

1. The master DB is downgraded to slave and is set to read-only mode. At the same time, sending routing information without a master node to the gateway.

2. The slave servers participating in the election stops their IO threads; and the slave servers participating in the election reports their latest binlog points.

3. The slave servers with the latest binlog loads the Realy Log and reports the GTID and binlog location information to the scheduler after the loading is completed.

4. Rebuilding the master and slave relationship

5. Modify the routing information, and switching is completed.

Based on the switching scheme proposed herein and the master and slave synchronization scheme of Mysql, the client side device needs to wait for the master to complete the synchronization of the binlog corresponding to the sql on the slave after issuing a sql in order to return normally. Otherwise, the client side will return a timeout error. Sometimes, when the master server suddenly crashes, there may not be enough time to send the binlog to the slave, then of course it is impossible to return to the client side successfully and the slave will not be synchronized to this data. When the master is recovered after being down, this data will be extra, so it is necessary to do a flash back of the data. The method is: perform a rollback for the new transaction according to row format of the binlog; and if rollback cannot be performed, such as for drop table and the like, use cold backup mechanism, pull mirror image from the new slave to reconstruct the data.

Figure 3A:
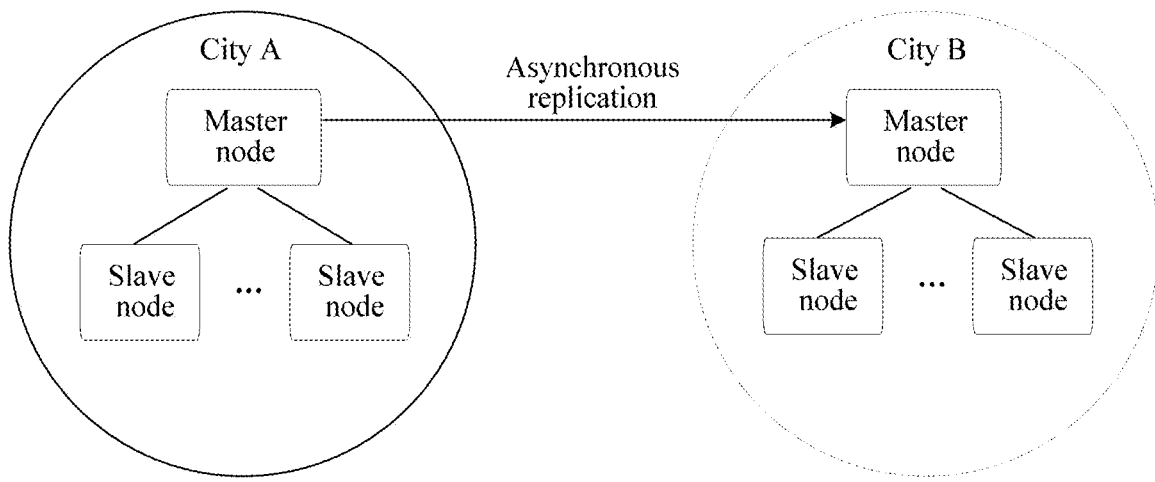
FIG. 3a is a schematic diagram of a scene of backup of a logic unit according to an embodiment of the present application.
Figure 3B:
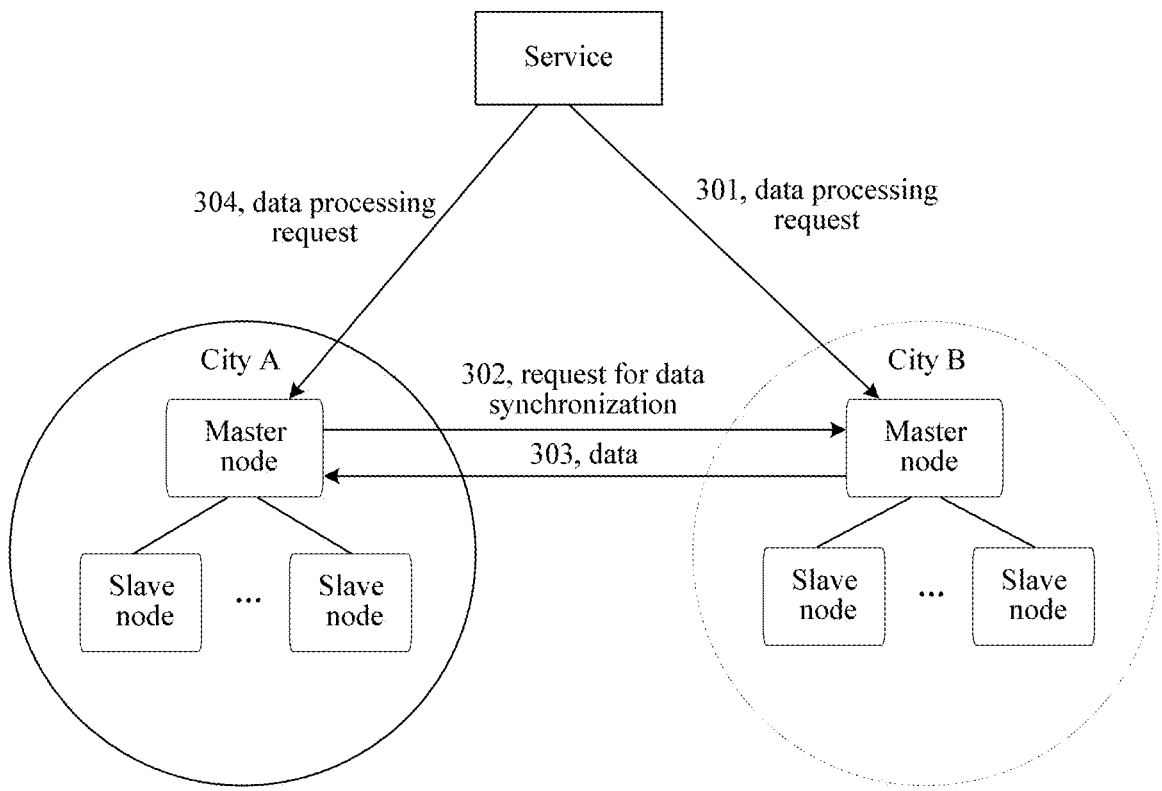
FIG. 3b is a schematic diagram of a scene of a cross-city disaster tolerance process according to an embodiment of the present application.

The Mysql high-availability architecture solution based on one master and multiple slaves as disclosed herein also supports cross-city disaster recovery. Two sets of instances are deployed in the same city and in different locations, and different synchronization schemes are adopted by the two sets to improve system performance. At the same time, the system can be restored after a disaster. The disaster recovery plan ensures data consistency, as shown in FIGS. 3a-3b and accompanying descriptions.

Reconstruction after Disaster

1. Based on the GTID position in the source set and the GTID position in the disaster recovery set, and extract the binlog.

2. Rebuild the source set. The source set uses the Watch-Set as the backup for the disaster recovery set.

3. Set read-only access to the disaster recovery set and wait for the synchronization data from other nodes in the same city.

4 When the delay of the data of the same-city node and the data of the disaster recovery location is 0, the business reverts to the city-based instance.

Benefits of Technical Solutions

The Mysql architecture solution based on the principle of multi-slaves proposed herein has greatly improved the usability of the system, taking into account the completeness of disaster recovery in the same city and in other places, and at the same time, no manual intervention is required for the disaster recovery process. The system automatically completes disaster recovery and maintains system availability while preventing data loss. In the process of research and practice on the existing technology, it has been found that although the existing disaster tolerance solution of master-master replication may guarantee the consistency of data before and after switchover to a certain extent; however, due to the presence of two masters, it is necessary to strictly distinguish the two devices on a service layer, otherwise, large-scale primary key conflicts may be caused when the masters are randomly selected for services. Therefore, the solution is complicated to implement, and the system availability is low.

The embodiments of the present application provide a data disaster tolerance method, device and system.

The data disaster tolerance system may include any data disaster tolerance device according to the embodiments of the present application. The number of the data disaster tolerance device may be determined according to the requirements of actual applications. In addition, as shown in FIG. 1a, the disaster tolerance system may also include other devices, such as an access gate way (GW), as well as one or more pieces of user equipment and the like. When a user establishes a new connection, the access gateway may receive a connection establishment request sent by the user equipment, acquire load information of a plurality of data disaster tolerance devices according to the connection establishment request, then select a matched data disaster tolerance device according to the load information, and establish a connection relation between the user equipment and the matched data disaster tolerance device. In this way, the user equipment subsequently sends a data processing request to the access gateway, the access gateway may forward the data processing request to the corresponding data disaster tolerance device based on the connection relation, and the data disaster tolerance device processes data according to the data processing request, e.g., reads, writes, deletes or changes the data, etc.

During specific implementation, the data disaster tolerance device may be implemented as an entity, and also may be implemented by a plurality of entities jointly, that is, the data disaster tolerance device may include a plurality of network devices. For example, as shown in FIG. 1b, the data disaster tolerance device may include a scheduler and a logic unit (set), wherein the logic unit may include a master node and a plurality of slave nodes. The nodes may be deployed in the same machine room, also may be deployed in different machine rooms, may be located in the same region, and also may be located in different regions.

The master node is mainly used for processing data according to a data processing request, for example, performing operations of reading or writing data, etc. The slave nodes may back up the data in the master node by data synchronization, and the slave nodes may provide a "read" function. The scheduler is mainly configured to monitor states of the nodes in the logic unit and control switchover of the master and slave nodes. For example, the scheduler specifically may monitor each node in the logic unit. If the master node is monitored to be abnormal, the scheduler acquires log information of the plurality of slave nodes separately, wherein the log information of the slave nodes includes time points of data synchronization between the slave nodes and the master node. Then, the slave node having the time point closest to current time is selected as a target node, and the master node is updated to the target node, that is, the target node is used as a new master node, and the original master node may be degraded as a slave node, etc.

In addition, the data disaster tolerance device may further include a proxy, which is configured to receive a data processing request sent by the access gateway, send the data processing request to a node of the corresponding logic unit according to preset routing information for processing, and interact with the scheduler to obtain the corresponding routing information, etc.

Detailed descriptions will be separately made below.

This embodiment will be described from the perspective of a data disaster tolerance device. The data disaster tolerance device may be implemented as an entity, and also may be implemented by a plurality of entities jointly, that is, the data disaster tolerance device specifically may be integrated in a server or other device, or may include a plurality of network devices, for example, may include a scheduler, a logic unit, etc. In addition, the data disaster tolerance device may further include other devices, such as a proxy and the like.

A data disaster tolerance method includes: monitoring each node in a logic unit; acquiring log information of a plurality of slave nodes separately when a master node is monitored to be abnormal, the log information of the slave nodes including time points of data synchronization between the slave nodes and the master node; selecting the slave node having the time point closest to current time as a target node; and updating the master node to the target node.

Figure 1C:
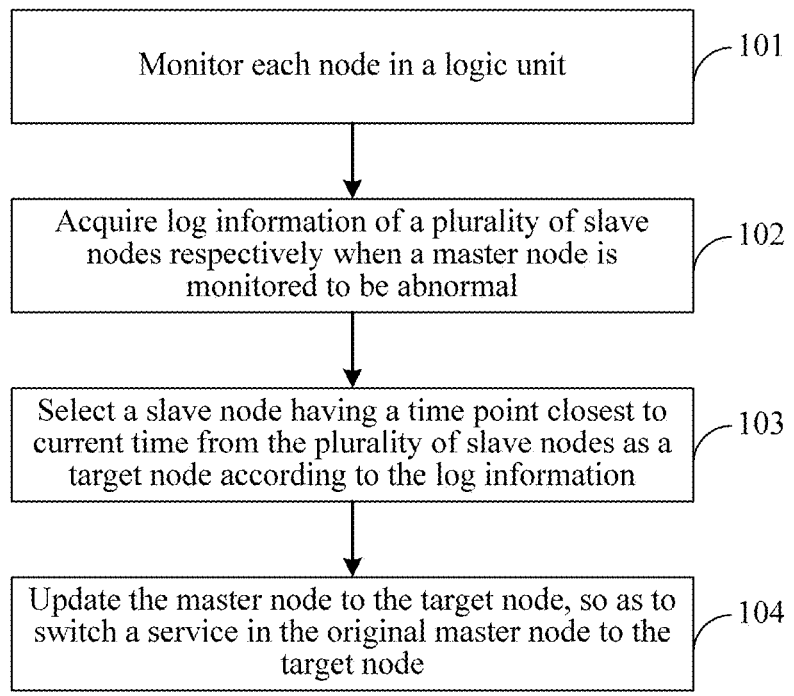
FIG. 1c is a flow diagram of the data disaster tolerance method according to an embodiment of the present application.

As shown in FIG. 1c, a specific process of the data disaster tolerance method may be as follows:

101. Monitor each node in a logic unit.

The nodes in the logic unit may include a master node and a plurality of slave nodes. The master node is mainly used for processing data according to a data processing request, for example, performing operations of reading or writing data, etc. The slave nodes may back up the data in the master node by data synchronization, and the slave nodes may provide a "read" function. These nodes may be deployed in the same machine room, also may be deployed in different machine rooms, may be located in the same region, and also may be located in different regions. In some embodiments, in order to improve the transmission efficiency, every two nodes may also transmit through a dedicated line.

There may be multiple methods for monitoring each node (including the master node and the slave nodes) in the logic unit, for example, monitoring a database instance such as a mysql (a relational database) instance, monitoring a transaction executed by each node, and/or monitoring a hardware state of each node in the logic unit and a core program running state, etc. For example, monitoring may be specifically as follows:

(1) Monitor the operation of a database instance of each node in the logic unit as follows:

periodically access a database instance in each node in the logic unit separately, and determine the corresponding node to be abnormal if the database instance is unreadable and/or unwritable.

(2) Monitor a transaction executed by each node in the logic unit as follows:

monitoring a working state of the master node when executing a transaction, and determining the master node to be abnormal if the working state indicates that the master node is in a non-working state currently; and in addition, monitoring a working state of each slave node in the logic unit when drawing a transaction thread from the master node, and determining the corresponding node to be abnormal if the working state indicates that the slave node is in a non-working state currently, e.g., the working state is "NO".

(3) Monitor a hardware state of each node in the logic unit and a core program running state as follows:

periodically acquiring hardware state information of each node in the logic unit and core program running state information, and determining the corresponding node to be abnormal when the node is determined to have a hardware failure according to the hardware state information and/or when the node is determined to have a software failure according to the core program running state information.

The logic unit may be preset, and also may be established by a system according to a specific service request. That is, before the step of "monitoring each node in a logic unit", the data disaster tolerance method may further include:

acquiring a service request sent by an access gateway, selecting a plurality of nodes according to the service request, creating a logic unit according to the selected nodes, and determining a master-slave relation between the nodes in the logic unit, so that the logic unit includes a master node and a plurality of slave nodes.

In some embodiments, in order to improve the security of data, when the data in the master node is synchronized to each slave node, the data may also be backed up to other storage device, such as a hadoop distribute file system (HDFS), i.e., a corresponding mirror file of the logic unit is saved in the HDFS. In this way, when a node in the logic unit fails, the data in the node of the logic unit may be recovered to a specified time point at a very fast speed (e.g., in seconds) based on the image file on the same day and the log information at the specified time point.

In some embodiments, in order to improve the efficiency of data backup and reduce the influence on the operation of each node during data backup, a corresponding node may also be selected from the slave nodes as a cold slave node to back up data. That is, after the step of "determining a master-slave relation between the nodes in the logic unit", the data disaster tolerance method may further include:

selecting one slave node from the plurality of slave nodes as a cold slave node according to a preset strategy, and backing up data to a hadoop distributed file system in a pipeline flow manner through the cold slave node. The so-called cold slave node refers to a node that backs up data to other location based on a cold backup mechanism.

In some embodiments, in order to further improve the efficiency of data backup and reduce the influence on the operation of each node, when the cold slave node backs up data to the hadoop distributed file system, the cold slave node may avoid an operation peak of the logic unit, for example, back up data once every day, and select a random event of the same day for backup, etc.

102. Acquire log information of the plurality of slave nodes separately when the master node is monitored to be abnormal.

The log information of the slave nodes may include time points of data synchronization between the slave nodes and the master node. In addition, In some embodiments, the log information may also include other information, e.g., the name of a transaction executed, type and/or size of data, etc. The log information of the slave nodes may be expressed in multiple forms, e.g., specifically may be a binlog, etc.

In some embodiments, when the master node is monitored to be abnormal, in addition to directly triggering the operation of "acquire log information of the plurality of slave nodes", performing the operation of "acquire log information of the plurality of slave nodes" may also be triggered by other method. For example, the master node may be downgraded to a slave node, so that the logic unit does not have a master node. In this way, the logic unit may generate state information indicating no master node. If the scheduler monitors the state information indicating no master node later, an input/output (I/O) interface for a synchronous log of the slave node may be stopped, and performing the operation of "acquiring log information of the plurality of slave nodes" is triggered. That is to say, before the step of "acquiring log information of the plurality of slave nodes separately", the data disaster tolerance method may further include:

degrading the master node to a slave node and stopping an I/O interface for a synchronous log (e.g., binlog) of the slave node.

When the master node is monitored to be abnormal, the data in the master node may also be recovered. For example, recovering may be specifically as follows:

acquire log information of the master node, recover the data in the master node according to the log information of the master node, etc.

The log information of the master node may include a time point when the master node updates data. In addition, In some embodiments, the log information may also include other information, e.g., a name of a transaction executed, a type and/or size of data, etc. The log information of the master node may be expressed in various forms, e.g., specifically may be a binlog, etc.

It should be noted that, in the embodiment of the present application, after the user equipment sends a data processing request, such as a structured query language (sql), normal returning is only realized when the master node synchronizes log information (e.g., binlog) corresponding to the data processing request to the slave nodes, otherwise, the user equipment returns a timeout error. Thus, when the master node suddenly becomes abnormal and the log information may not be sent to other slave nodes in time, if the master node recovers data according to own log information at this moment, the data will be redundant (i.e., the master node has more data than the slave nodes). Therefore, in order to avoid such a situation, before data recovery is performed on the master node, the log information corresponding to the data may be flashed back, i.e., before the step of "acquiring log information of the master node", the data disaster tolerance method may further include:

determining whether the data in the master node has been synchronized to the slave nodes, and if so, executing the step of acquiring the log information of the master node; and if not, flashing back the log information corresponding to the data that has not been synchronized.

In some embodiments, before the log information corresponding to the data that has not been synchronized is flashed black, whether the log information corresponding to the data that has not been synchronized may be flashed back may also be determined; if so, the step of flashing back the log information corresponding to the data that has not been synchronized is performed; otherwise, if the log information cannot be flashed back, full mirror data is drawn from the target node to reconstruct the data in the master node.

For example, a drop table or the like cannot be flashed back. Thus, for such data, full mirror data may be drawn from the target node to reconstruct the data, etc.

It should be noted that, besides that the data disaster tolerance device may automatically draw full mirror data from the target node, operation and maintenance staff may also intervene, that is, the full mirror data is manually drawn from the target node to reconstruct the data in the master node.

103. Select a slave node having the time point (i.e., the time point of data synchronization between the slave node and the master node) closest to current time from the plurality of slave nodes as a target node according to the log information.

For example, a current time point is 12:10:01 on July 1, a time point of data synchronization between a slave node A and the master node is 12:10:00 on July 1, a time point of data synchronization between a slave node B and the master node is 12:09:59 on July 1, and a time point of data synchronization between a slave node C and the master node is 12:10:01 on July 1. At this moment, the slave node C may be selected as a target node, thereby ensuring the consistency of data in the target node and data in the master node.

104. Update the master node to the target node, that is, take the target node as a new master node, so as to switch the service in the original master node to the target node.

In some embodiments, in order to improve the security of data, off-site backup may be performed on the data in the logic unit. For example, if the logic unit is located on a site A, the logic unit may be backed up on a site B, so that when the logic unit on the site A is abnormal, e.g., when a disaster occurs on the site A, a service of the logic unit on the site A may be switched to a slave logic unit on the site B. That is, the data disaster tolerance method may further include:

performing off-site backup on the logic unit to obtain a slave logic unit, and switching a service of the logic unit to the slave logic unit when the logic unit fails. The slave logic unit has a plurality of nodes that correspond to those of the logic unit one by one.

In addition, data reconstruction may also be performed on the logic unit on the site A by using data backed up on the site B. That is, after the step of "switching the service of the logic unit to the slave logic unit", the data disaster tolerance method may further include:

synchronizing data of each node in the slave logic unit to a corresponding node in the logic unit; setting the slave logic unit to be read-only when delay between data of each node in the logic unit and the slave logic unit is determined to be smaller than a preset value; and switching the service back to the logic unit when the delay (i.e., the delay between data of each node in the logic unit and the slave logic unit) is 0.

The preset value may be set according to the requirement of an actual application, and is not further described herein.

From the foregoing, in this embodiment, each node in a logic unit is monitored; when a master node is monitored to be abnormal, log information of a plurality of slave nodes is acquired separately, wherein the log information of the slave nodes includes time points of data synchronization between the slave nodes and the master nodes; then, a slave node having the time point closest to current time is selected as a target node; and the master node is updated to the target node, so that master-slave switchover is realized. The logic unit in this solution may include a plurality of slave nodes, and the slave node with latest data is selected as a new master node when the master node is abnormal, so that the data consistency between the original master node and the new master node may be ensured before and after switchover. In addition, since the logic unit has only one master node, the problem of large-scale primary key conflicts as in the existing technology is avoided, each device does not need to be distinguished on a service layer, the implementation is simpler, and the system availability may be greatly improved.

According to the method described in the above embodiment, examples will be further described in detail below.

In this embodiment, a data disaster tolerance system includes user equipment, an access gateway and a plurality of data disaster tolerance devices, and the data disaster tolerance device includes a proxy, a scheduler and a logic unit (set) as an example.

Figure 2A:
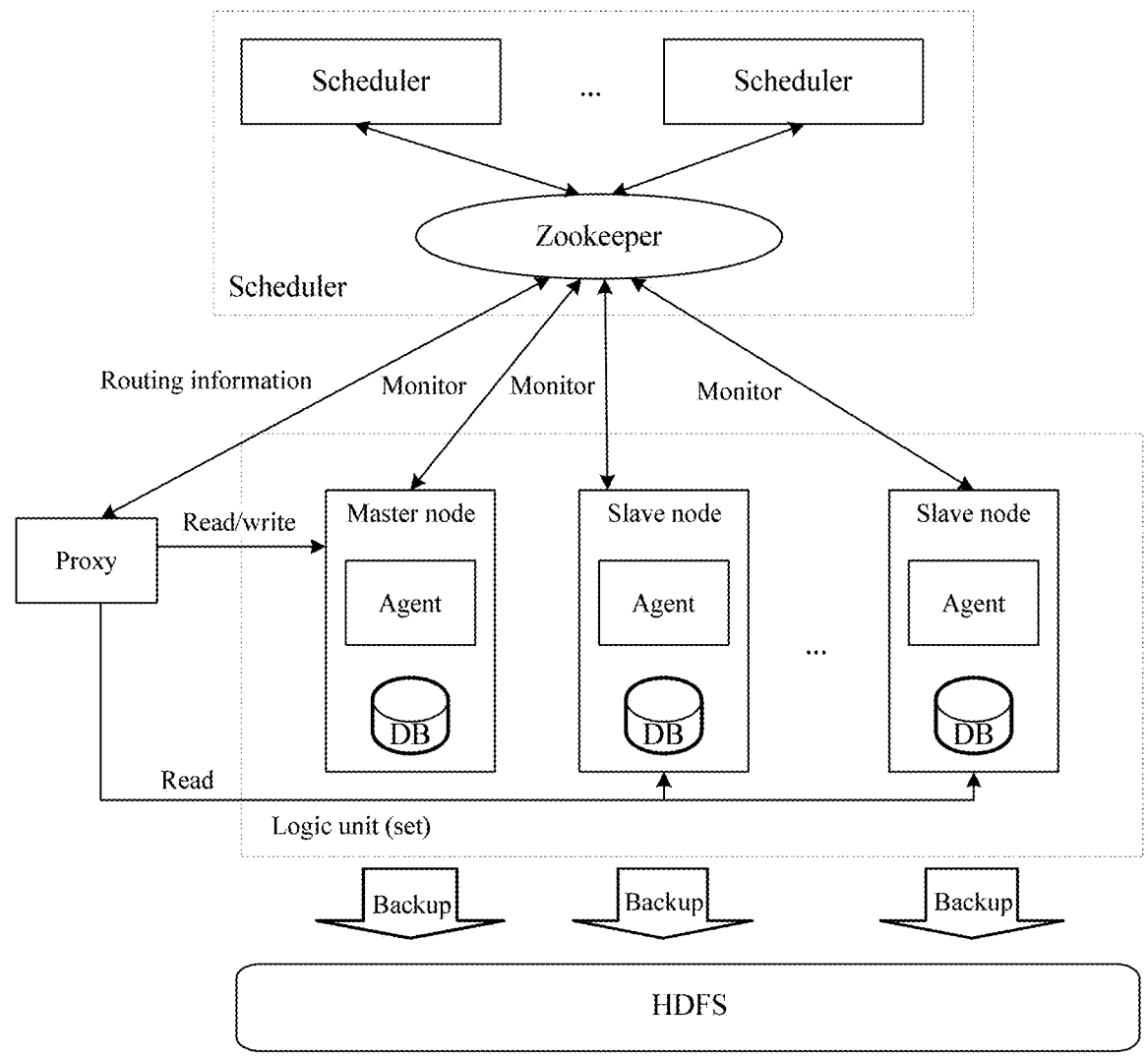
FIG. 2a is an architecture example diagram of a data disaster tolerance device according to an embodiment of the present application.

Referring to FIG. 1a, FIG. 1b and FIG. 2a, specific functions of each device in the data disaster tolerance system may be as follows:

(1) User Equipment;

The user equipment is configured to establish a connection relation with a data disaster tolerance device through an access gateway, and to send a data processing request to the corresponding data disaster tolerance device through the access gateway based on the connection relation, so as to obtain a corresponding service.

(2) Access Gateway;

When a user establishes a new connection, the access gateway may acquire load information of a plurality of data disaster tolerance devices, select a matched data disaster tolerance device based on the load information, and establish a connection relation between the user equipment and the matched data disaster tolerance device. In addition, the access gateway may also save related information of the connection relation, e.g., save session information of the connection, etc. For a user request that has established a connection, e.g., the data processing request sent by the user equipment, the data processing request may be forwarded to the corresponding data disaster tolerance device according to the session information of the connection, so as to fulfill the purpose of load balance.

In order to timely and accurately acquire the load information of each data disaster tolerance device, a service list may also be set to save information of a plurality of data disaster tolerance devices that may provide services. In this way, when a data disaster tolerance device requires to be selected, the required data disaster tolerance device may be selected according to the information in the service list. At the same time, in order to maintain the accuracy and timeliness of the information in the service list, the access gateway may also periodically detect a state of each data disaster tolerance device, and update the information in the service list based on the states, e.g., the access gateway may timely delete the failing data disaster tolerance device from the service list, and may add the data disaster tolerance device back to the service list when the failing data disaster tolerance device is detected to return to normal, etc.

It should be noted that the access gateway saves the session information of the connection, and even if the data disaster tolerance devices are expanded, e.g., a few more data disaster tolerance devices are added, the existing user connection is not affected, so this solution can facilitate expansion.

(3) Data Disaster Tolerance Device;

Referring to FIG. 1b, the data disaster tolerance device may include devices such as a proxy, a scheduler and a logic unit (set), specifically as follows:

A. Proxy;

The proxy is configured to acquire and save routing information from the scheduler, and to forward the data processing request (such as an sql statement) sent by the user equipment to the logic unit according to the routing information.

In addition, the proxy may also authenticate the received data processing request, for example, according to an identifier of the user equipment carried in the data processing request, such as an internet protocol (IP) address, a user name and/or a user password and other information, etc.

B. Scheduler;

The scheduler serves as a scheduling management center of the data disaster tolerance device, and may perform operations such as creating and deleting a logic unit (set), and selecting and replace a node in the logic unit. In addition, the scheduler may also monitor each node in the logic unit, and initiate a master-slave switchover process when the master node is monitored to be abnormal. For example, the scheduler may acquire log information of a plurality of slave nodes separately, and select a new master node according to the log information, etc.

The scheduler may include multiple Schedulers, and then the multiple Schedulers cooperate to complete main operations of the scheduler, e.g., creating and deleting a logic unit, selecting and replacing a node in the logic unit, monitoring a state of each node, initiating a master-slave switchover process when the master node is determined to be abnormal, etc. The interaction between the Schedulers and other parts (e.g., the proxy and the logic unit) may be completed through an open source distributed application coordination service, e.g., Zookeeper. For example, the Zookeeper may receive state information reported by each node, and provide the state information to the Schedulers, or, the Schedulers may monitor the Zookeeper and acquire the state information of the corresponding node from the Zookeeper, etc.

Figure 2B:
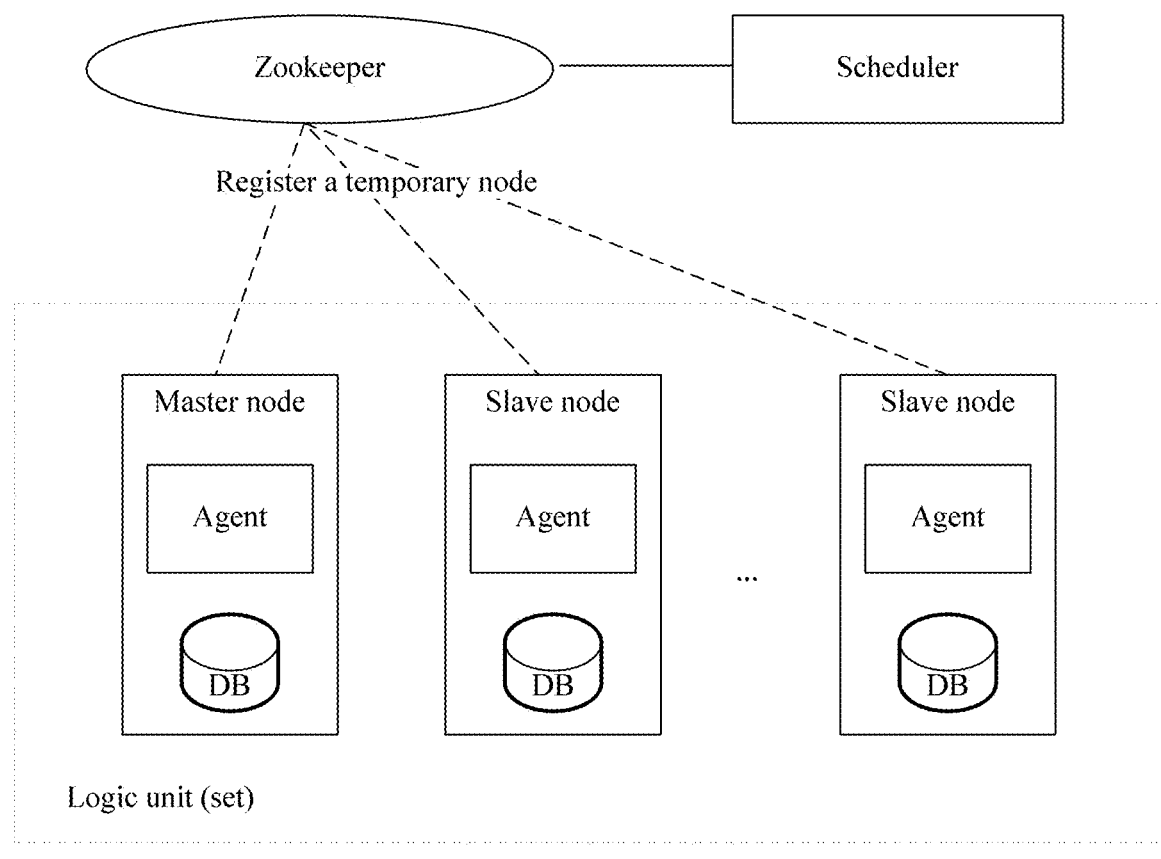
FIG. 2b is a schematic diagram of a scene during registration of temporary nodes in the data disaster tolerance method according to an embodiment of the present application.

It should be noted that since the Zookeeper may face multiple logic units, in order to facilitate the management on each logic unit, as shown in FIG. 2b, when a logic unit is established, a temporary node corresponding to the logic unit may be registered in the Zookeeper, and the temporary node deals with a transaction of the logic unit, e.g., receiving state information of each node in the logic unit, etc.

It should be noted that the disaster tolerance of the Schedulers may be completed through an election mechanism of the Zookeeper, and is not further described herein.

C. Logic Unit (Set);

The logic unit may include a master node and a plurality of slave nodes. The master node is mainly used for processing data according to a data processing request, for example, performing operations of reading or writing data, etc. The slave nodes may back up the data in the master node by data synchronization, and the slave nodes may provide a "read" function. These nodes may be deployed in the same machine room, also may be deployed in different machine rooms, may be located in the same region, and also may be located in different regions.

In order to facilitate the management and data transmission on these nodes, an agent may also be separately set for each node. The agent may be independent from each node, and also may be integrated in each node, for example, shown in FIG. 2a.

The agent may periodically access a database instance (DB) of a respective subordinate node by means of short connection, so as to detect whether the database instance is readable and writable. If the database instance is readable and writable, the node is indicated to be normal. If the database instance is not readable and/or not writable, the node is indicated to be abnormal. At this moment, the agent may generate corresponding state information indicating the abnormality of the node, and report the state information to the scheduler, e.g., specifically to the corresponding temporary node in the Zookeeper, so that the scheduler may detect that the node is abnormal and then perform master-slave switchover.

A cycle that the agent accesses the database instance of the respective subordinate node may be determined according to the requirement of an actual application, for example, the access cycle may be set to monitoring once every three seconds, etc.

The agent may also make statistics on delay time when the subordinate node executes a transaction, and the number of delayed transactions, and periodically report state information carrying a statistical result to the scheduler. For example, the agent may specifically report the to the corresponding temporary node in the Zookeeper, so that the scheduler may determine whether to initiate a master-slave switchover process accordingly, for example, if the statistical result exceeds a preset threshold, master-slave switchover is performed, etc.

In addition, if the master-slave switchover occurs, the agent may also reestablish a master-slave relation according to the new master node. For a new database instance, the agent may also reestablish data through the master node by means of xtrabackup (a data backup tool) and the like. Therefore, the data reconstruction of this solution may be performed automatically without the intervention of a database administrator (DBA).

It should be noted that, the temporary node corresponding to the logic unit is registered in the Zookeeper; if the logic unit has a hardware failure and/or a core program is abnormal, e.g., the agent has a core failure, the corresponding temporary node in the ZooKeeper may be correspondingly deleted. Therefore, if the Scheduler detects that the temporary node disappears, it may be determined that the master node in the logic unit is abnormal. In this case, the master-slave switchover may be performed.

Based on an architecture of the above-mentioned data disaster tolerance system, the following will describe its implementation process in detail.

Figure 2C:
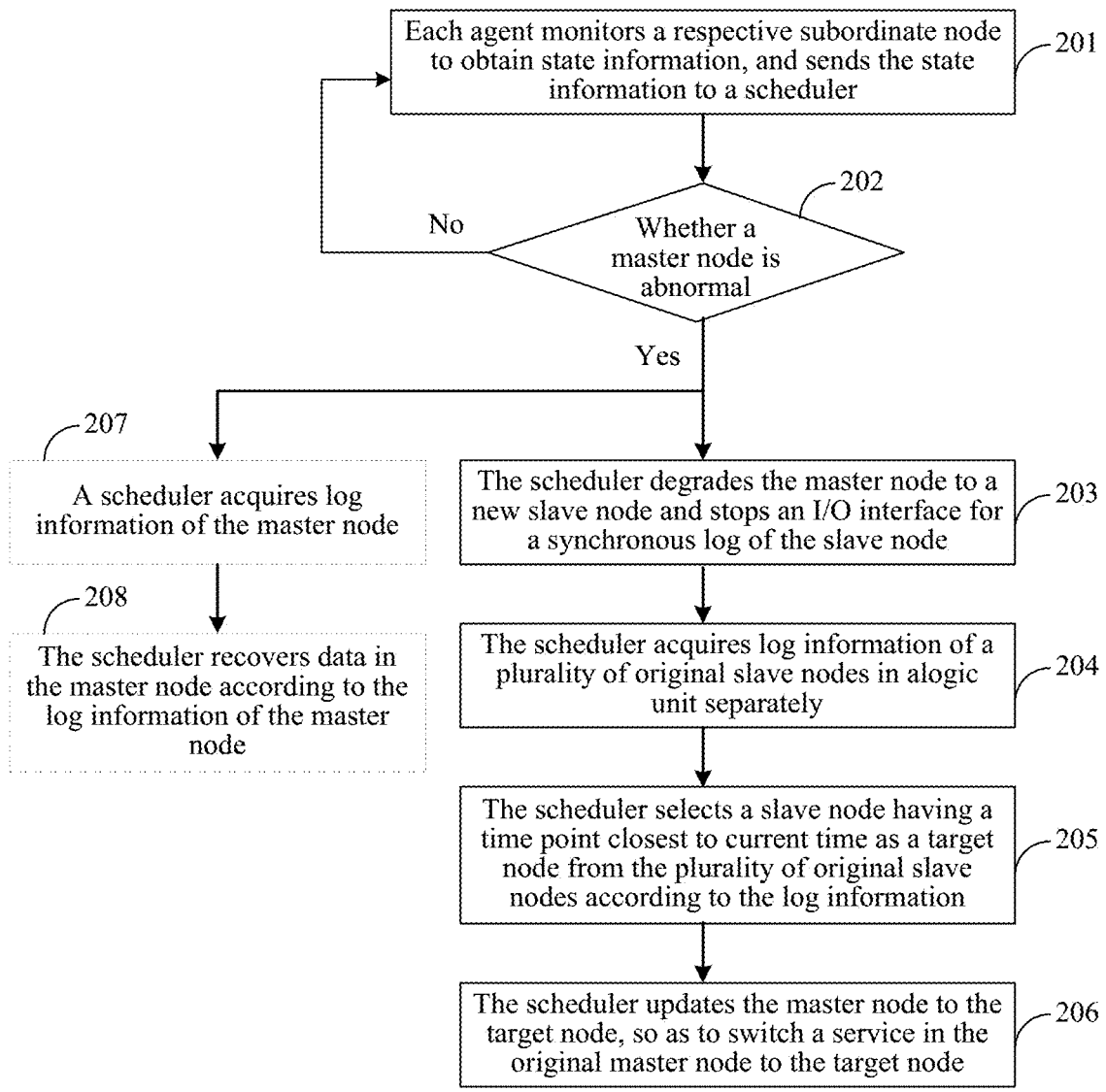
FIG. 2c is another flow diagram of the data disaster tolerance method according to an embodiment of the present application.

As shown in FIG. 2c, a specific process of a data disaster tolerance method may be as follows:

201. Each agent in a logic unit monitors a respective subordinate node to obtain state information, and sends the state information to a scheduler.

For example, taking a master node A as an example, an agent A of the master node A may monitor the master node A by a following method:

The agent A periodically accesses a database instance of the master node A to detect whether the database instance is readable and writable. If the database instance is readable and writable, the agent A determines that the master node A is normal. If the database instance is not readable and/or not writable, the agent A determines that the master node A is abnormal, generates corresponding state information indicating the abnormality of the node, and reports the state information indicating the abnormality of the node to the scheduler, e.g., to a corresponding temporary node in a Zookeeper.

And/or, the agent A periodically acquires hardware state information of the agent A per se and the master node A as well as core program running state information, and sends the hardware state information and the core program running state information to the scheduler, e.g., specifically to the corresponding temporary node in the Zookeeper, etc.

It should be noted that the foregoing monitoring method of the agent A on the master node A is also applicable to other nodes, which is not further described herein.

202. After receiving the state information, the scheduler determines whether the corresponding master node is abnormal according to the state information. If abnormality occurs, step 203 is performed, and if abnormality does not occur, step 201 may be performed.

For example, the corresponding temporary node in the Zookeeper may specifically receive the state information, and provide the state information to the Scheduler. When the Scheduler determines that the master node is abnormal according to the state information, step 203 is performed.

It should be noted that, when the logic unit has a hardware failure and/or a core program in the logic unit is abnormal, the corresponding temporary node of the logic unit will disappear. Thus, if the Scheduler detects that the temporary node has disappeared, it may also be determined that the master node in the logic unit is abnormal. At this moment, step 203 may also be performed.

203. The scheduler degrades the master node to a new slave node, stops an I/O interface for a synchronous log (e.g., binlog) of the slave node, and then performs step 204.

For example, specifically, the Scheduler may degrade the master node to a new slave node, and send a thread stop instruction to the slave node through the Zookeeper, so that the slave node may stop an I/O interface for a synchronous log (e.g., binlog) according to the thread stop instruction, etc.

204. The scheduler acquires log information of a plurality of original slave nodes in the logic unit separately.

For example, specifically, the scheduler may acquire log information of the plurality of original slave nodes in the logic unit, e.g., relaylogs, etc.

The log information of the slave nodes may include time points of data synchronization between the slave nodes and the master node. In addition, In some embodiments, the log information may also include other information, e.g., a name of a transaction executed, a type and/or size of data, etc.

205. The scheduler selects a slave node having the time point (i.e., the time point of data synchronization between the slave node and the master node) closest to current time as a target node from the plurality of original slave nodes according to the log information.

For example, specifically, the Scheduler may select the target node. For instance, a current time point is 12:10:01 on July 1, a time point of data synchronization between a slave node A and the master node is 12:10:00 on July 1, a time point of data synchronization between a slave node B and the master node is 12:09:59 on July 1, and a time point of data synchronization between a slave node C and the master node is 12:10:01 on July 1. At this moment, the Scheduler may select the slave node C as a target node.

206. The scheduler updates the master node to the target node, that is, the target node is used as a new master node, so as to switch a service in the original master node to the target node.

For example, specifically, the Scheduler may update the master node to the target node. For instance, the Scheduler may generate indication information indicating that the master node is updated to the target node, and then send the indication information to the agent of the target node through the Zookeeper. In this way, the agent may reestablish a master-slave relation based on the indication information, for example, determine the target node per se as a new master node and other nodes as slave nodes, generate corresponding routing information, and then provide the routing information to the Scheduler through the Zookeeper, etc.

In some embodiments, as shown in FIG. 2a, in order to improve the security of data, when the data in the master node is synchronized to each slave node, the data may also be backed up to other storage device, e.g., to a hadoop distributed file system.

It should be noted that, in order to improve the efficiency of data backup and reduce the influence on the operation of each node during data backup, a slave node may be selected as a cold slave node from the plurality of slave nodes, to back up data to the distributed file system; in addition, when the cold slave node backs up data, transmission to the distributed file system may be performed in a flow pipeline manner to improve the transmission efficiency; furthermore, a random event on the same day may also be selected for backup, so as to avoid the operation peak of the logic unit.

In some embodiments, when the master node is determined to be abnormal (i.e., step 202), data in the master node may also be recovered in addition to master-slave switchover, that is, the data disaster tolerance method may include step 207 as follows:

207. The scheduler acquires log information of the master node, and then performs step 209.

For example, specifically, the Scheduler may acquire log information of the master node, e.g., relaylog, etc.

The log information of the master node may include a time point when the master node updates data (i.e., a time point when the master node updates own data). In addition, In some embodiments, the log information may also include other information, e.g., a name of a transaction executed, a type and/or size of data, etc.

It should be noted that, in order to avoid redundant data in the log information of the master node (specifically see the description in the embodiment shown in FIG. 1c), whether the data in the master node has been synchronized to the slave nodes may be determined first, and if so, the step of acquiring the log information of the master node (i.e., step 207) is performed, otherwise, the log information corresponding to the data that has not been synchronized may be flashed back.

In some embodiments, before the log information corresponding to the data that has not been synchronized is flashed black, whether the log information corresponding to the data that has not been synchronized may be flashed back may also be judged; if the log information may be flashed back, the step of flashing back the log information corresponding to the data that has not been synchronized is performed; otherwise, if the log information cannot be flashed back, at this moment, full mirror data may be drawn from the target node, so as to reconstruct the data in the master node. The specific description may refer to the above-mentioned embodiment, and is not further described in detail.

It should also be noted that the sequence of step 207 and steps 203-206 may be random.

208. The scheduler recovers the data in the master node according to the log information of the master node.

From the foregoing, in this embodiment, each node in a logic unit is monitored; when a master node is monitored to be abnormal, log information of a plurality of slave nodes is acquired separately, wherein the log information of the slave nodes includes time points of data synchronization between the slave nodes and the master node; then, a slave node having the time point closest to current time is selected as a target node; and the master node is updated to the target node, so that master-slave switchover is realized. The logic unit in this solution may include a plurality of slave nodes, and the slave node with latest data is selected as a new master node when the master node is abnormal, so that the data consistency between the original master node and the new master node may be ensured before and after switchover. In addition, since the logic unit has only one master node, the problem of large-scale primary key conflicts in the existing technology is avoided, each device does not need to be distinguished on a service layer, the implementation is simpler, and the system availability may be greatly improved.

In some embodiments, in this solution, when the data in the original master node is recovered, the log information corresponding to the data that has not been synchronized to the slave nodes may also be flashed back, so that the consistency of data between the nodes and before and after switchover may be further improved.

Moreover, in this solution, the corresponding slave node may be selected as a cold slave node from the plurality of slave nodes, and data is backed up to a hadoop distributed file system through the cold slave node, so that the efficiency of data backup may be greatly improved, the influence on the operation of each node during data backup is reduced, and the performance of the entire data disaster tolerance system is improved.

Based on the above-mentioned embodiment, In some embodiments, in order to improve the security of data, off-site backup may be performed on the data in the logic unit. For example, if the logic unit is located on a site A, backup may be performed on the logic unit on a site B, so that when the logic unit on the site A is abnormal, e.g., when a disaster occurs on the site A, a service of the logic unit on the site A may be switched to a slave logic unit on the site B.

The following will describe an original logic unit in a city A and a backup logic unit in a city B as an example.

As shown in FIG. 3a, data in the logic unit of the city A may be backed up to the city B, for example, the data of a master node in the logic unit of the city A may be asynchronously transmitted to a master node in the logic unit of the city B, and then the master node in the logic unit of the city B synchronizes the data to other slave nodes in the logic unit (i.e., the logic unit of the city B).

When the logic unit of the city A fails, for example, when a natural disaster such as a flood or an earthquake occurs or some other man-made disasters such as war or explosion occur in the city A, resulting in that the logic unit fails, a service of the logic unit of the city A may be switched to the logic unit of the city B and recovered using the data in the logic unit of the city B. After the data of the logic unit of the city A is recovered, the service may be switched back to the logic unit of the city A. For example, referring to FIG. 3b, the details may be as follows:

301. After the service in the logic unit of the city A is switched to the logic unit of the city B, a data processing request originally sent to the logic unit of the city A by the service is also forwarded to the logic unit of the city B, i.e., at this moment, the master node in the logic unit of the city B may receive the data processing request, and process data according to the data processing request.

302. When the logic unit of the city A needs data reconstruction, the logic unit of the city A may send a request for data synchronization (i.e., requesting for data synchronization) to the logic unit of the city B.

303. After the logic unit of the city B receives the request for data synchronization, the data of the logic unit of the city B is synchronized to the logic unit of the city A.

For example, a GTID (Global Transaction ID) of the logic unit of the city A and log information of each node in the logic unit of the city A may be acquired. After the logic unit of the city B receives the request for data synchronization, a GTID of the logic unit of the city B, log information of each node in the logic unit of the city B and the like, as the data of the logic unit of the city B, are synchronized to the logic unit of the city A based on these GTIDs and log information, etc.

304. When the delay between data in the logic unit of the city A and the logic unit of the city B is determined to be smaller than a preset value, the logic unit of the city B is set to be read-only, and when the delay is equal to 0, the service is switched back to the logic unit of the city A, i.e., at this moment, the master node in the logic unit of the city A may receive a data processing request sent by the corresponding service and process data according to the data processing request.

The preset value may be set according to the requirement of an actual application, and is not further described herein.

Figure 4A:
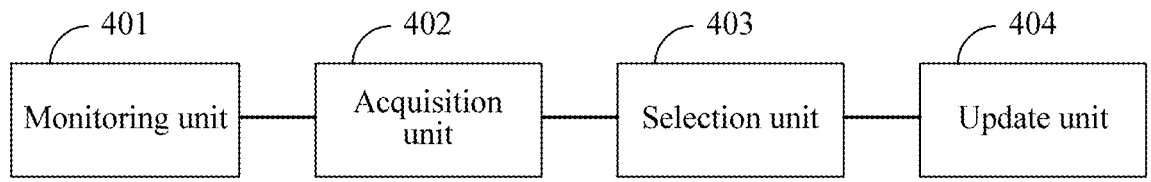
FIG. 4a is a structure diagram of the data disaster tolerance device according to an embodiment of the present application.

Hence, this embodiment not only can achieve the beneficial effects achieved by the embodiment as shown in FIG. 2c, but also can support cross-city disaster tolerance, thereby greatly improving the security of data To better implement the above method, an embodiment of the present application further provides a data disaster tolerance device. As shown in FIG. 4a, the data disaster tolerance device includes a monitoring unit 401, an acquisition unit 402, a selection unit 403 and an update unit 404 as follows:

(1) Monitoring Unit 401;

The monitoring unit 401 is configured to monitor each node in a logic unit.

The nodes include a master node and a plurality of slave nodes. These nodes may be deployed in the same machine room, also may be deployed in different machine rooms, may be located in the same region, and also may be located in different regions. The detail may refer to the aforementioned embodiment, and is not further described herein.

There may be multiple methods for monitoring each node in the logic unit, for example, monitoring a database instance such as a mysql instance, monitoring a transaction executed by each node, and/or monitoring a hardware state of each node in the logic unit and a core program running state, etc., specifically as follows:

The monitoring unit 401 specifically may be configured to monitor the operation of a database instance of each node in the logic unit as follows for example:

to periodically access a database instance in each node in the logic unit, and determine the corresponding node to be abnormal if the database instance is unreadable and/or unwritable.

And/or, the monitoring unit 401 specifically may be configured to monitor a transaction executed by each node in the logic unit as follows for example:

to separately monitor a working state of each slave node in the logic unit when drawing a transaction thread from the master node, and to determine the corresponding node to be abnormal if the working state indicates that the slave node is in a non-working state currently, e.g., the working state is "NO".

And/or, the monitoring unit 401 specifically may be configured to monitor a hardware state of each node in the logic unit and a core program running state as follows for example:

to periodically acquire hardware state information of each node in the logic unit and core program running state information, and determine the corresponding node to be abnormal when the node is determined to have a hardware failure according to the hardware state information and/or when the node is determined to have a software failure according to the core program running state information.

Or, a temporary node corresponding to the logic unit is registered, wherein when the logic unit has a hardware failure, and/or a core program is abnormal, the temporary node is deleted; when the temporary node is detected to disappear, the master node is determined to be abnormal.

(2) Acquisition Unit 402;

The acquisition unit 402 is configured to acquire log information of the plurality of slave nodes separately when the master node is monitored to be abnormal.

The log information of the slave nodes may include time points of data synchronization between the slave nodes and the master node. In addition, In some embodiments, the log information may also include other information, e.g., a name of a transaction executed, a type and/or size of data, etc. The log information of the slave nodes may be expressed in multiple forms, e.g., specifically may be a binlog, etc.

(3) Selection Unit 403;

The selection unit 403 is configured to select a slave node having the time point closest to current time from the plurality of slave nodes as a target node.

(4) Update Unit 404;

The update unit 404 is configured to update the master node to the target node.

That is, the update unit 404 may take the target node as a new master node, so as to switch a service in the original master node to the target node.

In some embodiments, when the master node is monitored to be abnormal, in addition to directly triggering the acquisition unit 402 to perform the operation of "acquiring log information of the plurality of slave nodes", performing the operation of "acquiring log information of the plurality of slave nodes" may also be triggered by other method. For example, the master node may be degraded to a slave node, so that the logic unit does not have a master node. In this way, the logic unit may generate state information indicating no master node. If a scheduler monitors the state information later, the scheduler may stop an I/O interface for a synchronous log (binlog) of the slave node, and trigger the acquisition unit 402 to perform the operation of "acquiring log information of the plurality of slave nodes". That is, as shown in FIG. 4b, the data disaster tolerance device may further include a processing unit 405 as follows:

The processing unit 405 specifically may be configured to degrade the master node to a new slave node when the monitoring unit 401 monitors that the master node is abnormal, stop an I/O interface for a synchronous log (binlog) of the slave node, and trigger the acquisition unit 402 to perform the operation of acquiring log information of the plurality of slave nodes separately.

Figure 4B:
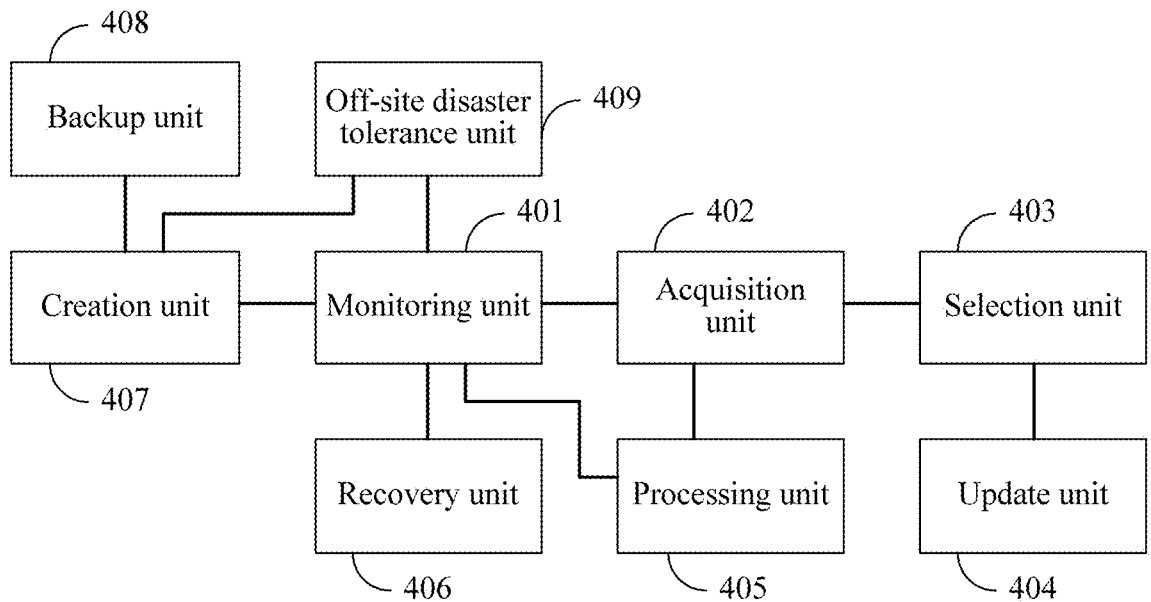
FIG. 4b is another structure diagram of the data disaster tolerance device according to an embodiment of the present application.

In addition, when the master node is monitored to be abnormal, data in the master node may also be recovered, i.e., as shown in FIG. 4b, the data disaster tolerance device may further include a recovery unit 406 as follows:

The recovery unit 406 may be configured to acquire log information of the master node when the monitoring unit 401 monitors that the master node is abnormal, and recover the data in the master node according to the log information of the master node.

The log information of the master node may include a time point when the master node updates data (i.e., a time point when the master node updates own data). In addition, In some embodiments, the log information may also include other information, e.g., a name of a transaction executed, a type and/or size of data, etc. The log information of the master node may be expressed in multiple forms, e.g., specifically may be a binlog, etc.

It should be noted that, in order to avoid redundant data in the log information of the master node (specifically see the description in the embodiment shown in FIG. 1c), whether the data in the master node has been synchronized to the slave nodes may be determined first, and if so, the operation of acquiring the log information of the master node is performed, otherwise, the log information corresponding to the data that has not been synchronized may be flashed back at this moment. That is:

The recovery unit 406 may also be configured to determine whether the data in the master node has been synchronized to the slave nodes, and if so, perform the operation of acquiring the log information of the master node; and if not, flash back the log information corresponding to the data that has not been synchronized.

In some embodiments, in order to reduce invalid operations, before the log information corresponding to the data that has not been synchronized is flashed back, whether the log information corresponding to the data that has not been synchronized may be flashed back may also be judged, and the log information is flashed back when it is determined that the log information may be flashed back. That is:

The recovery unit 406 may also be configured to determine whether the log information corresponding to the data that has not been synchronized may be flashed back; if so, flash back the log information corresponding to the data that has not been synchronized; otherwise, draw mirror data from the target node, so as to reconstruct the data in the master node. The detail may refer to the aforementioned embodiment, and is not further described herein.

The logic unit may be preset, and also may be established by a system according to a specific service request, i.e., as shown in FIG. 4b, the data disaster tolerance device may further include a creation unit 407 as follows:

The creation unit 407 may be configured to acquire a service request sent by an access gateway, select a plurality of nodes according to the service request, create a logic unit according to the selected nodes, and determine a master-slave relation between the nodes in the logic unit, so that the logic unit includes a master node and a plurality of slave nodes.

In some embodiments, in order to improve the security of data, when the data in the master node is synchronized to each slave node, the data may also be backed up to other storage device, e.g., to a hadoop distributed file system, i.e., as shown in FIG. 4b, the data disaster tolerance device may further include a backup unit 408 as follows:

The backup unit 408 may be configured to select one slave node from the plurality of slave nodes as a cold slave node according to a preset strategy after the creation unit 407 determines the master-slave relation between the nodes in the logic unit, and back up data to a hadoop distributed file system in a pipeline flow manner through the cold slave node.

In some embodiments, in order to improve the security of data, off-site backup may be performed on the data in the logic unit. For example, if the logic unit is located on a site A, off-site backup may be performed on the logic unit on a site B, so that when the logic unit on the site A is abnormal, e.g., when a disaster occurs on the site A, a service of the logic unit on the site A may be switched to a slave logic unit on the site B, i.e., as shown in FIG. 4b, the data disaster tolerance device may further include an off-site disaster tolerance unit 409 as follows:

The off-site disaster tolerance unit 409 is configured to perform off-site backup on the logic unit to obtain a slave logic unit, and switch a service of the logic unit to the slave logic unit when the logic unit fails.

In addition, data reconstruction may also be performed on the logic unit on the site A by using the data backed up on the site B, that is:

The off-site disaster tolerance unit 409 may also be configured to synchronize data of each node in the slave logic unit to a corresponding node in the logic unit, set the slave logic unit to be read-only when delay between data of each node in the logic unit and the slave logic unit is determined to be smaller than a preset value, and switch the service back to the logic unit when the delay is determined to be equal to 0.

The preset value may be set according to the requirement of an actual application, and is not further described herein.

In specific implementation, the above units may be implemented as independent entities, and also may be combined in any combination and implemented as one or a plurality of entities. For example, referring to the embodiments shown in FIG. 2*c* and FIG. 3*b*, the data disaster tolerance device may include a proxy, a scheduler and a logic unit, etc. For the specific implementation of each unit above, reference may be made to the foregoing method embodiment, and details are not further described herein.

From the foregoing, the monitoring unit 401 in the data disaster tolerance device of this embodiment may monitor each node in a logic unit; when a master node is monitored to be abnormal, the acquisition unit 402 acquires log information of a plurality of slave nodes separately, wherein the log information of the slave nodes includes time points of data synchronization between the slave nodes and the master nodes; then, the selection unit 403 selects a slave node having the time point closest to current time as a target node; and the update unit 404 updates the master node to the target node, so that master-slave switchover is realized. The logic unit in this solution may include a plurality of slave nodes, and the slave node with latest data is selected as a new master node when the master node is abnormal, so that the data consistency between the original master node and the new master node may be ensured before and after switchover. In addition, since the logic unit has only one master node, the problem of large-scale primary key conflicts in the existing technology is avoided, each device does not need to be distinguished on a service layer, the implementation is simpler, and the system availability may be greatly improved.

Correspondingly, an embodiment of the present application further provides a data disaster tolerance system, including any data disaster tolerance device according to the embodiments of the present application. Reference may be made to the aforementioned embodiment. For example, the data disaster tolerance device may be as follows:

The data disaster tolerance device is configured to monitor each node in a logic unit; acquire log information of a plurality of slave nodes separately when a master node is monitored to be abnormal, the log information of the slave nodes including time points of data synchronization between the slave nodes and the master node; select the slave node having the time point closest to current time as a target node; and update the master node to the target node.

For example, the data disaster tolerance device specifically may be configured to monitor operation of a database instance of each node in the logic unit, a transaction executed by each node in the logic unit, and/or a hardware state of each node in the logic unit and a core program running state, etc.

For the specific implementation of the data disaster tolerance device, reference may be made to the foregoing embodiments, and details are not further described herein.

A plurality of data disaster tolerance devices may be included, and the specific number may be determined according to the requirement of an actual application.

In addition, the data disaster tolerance system may further include other devices, e.g., may further include an access gateway as follows:

The access gateway is configured to receive a connection establishment request sent by user equipment, acquire load information of a plurality of disaster tolerance devices according to the connection establishment request, select a matched data disaster tolerance device according to the load information, and establish a connection relation between the user equipment and the matched disaster tolerance device; as well as receive a data processing request sent by the user equipment, and send the data processing request to the corresponding data disaster tolerance device based on the connection relation.

The data disaster recovery system may further include user equipment, which is configured to send a connection establishment request to the access gateway, send a data processing request, etc.

For the specific operation of each device above, reference may be made to the foregoing embodiments, and details are not further described herein.

The data disaster tolerance system may include any data disaster tolerance device according to the embodiments of the present application, and thus can achieve the beneficial effects that can be achieved by any data disaster tolerance device according to the embodiments of the present application.

Figure 5:
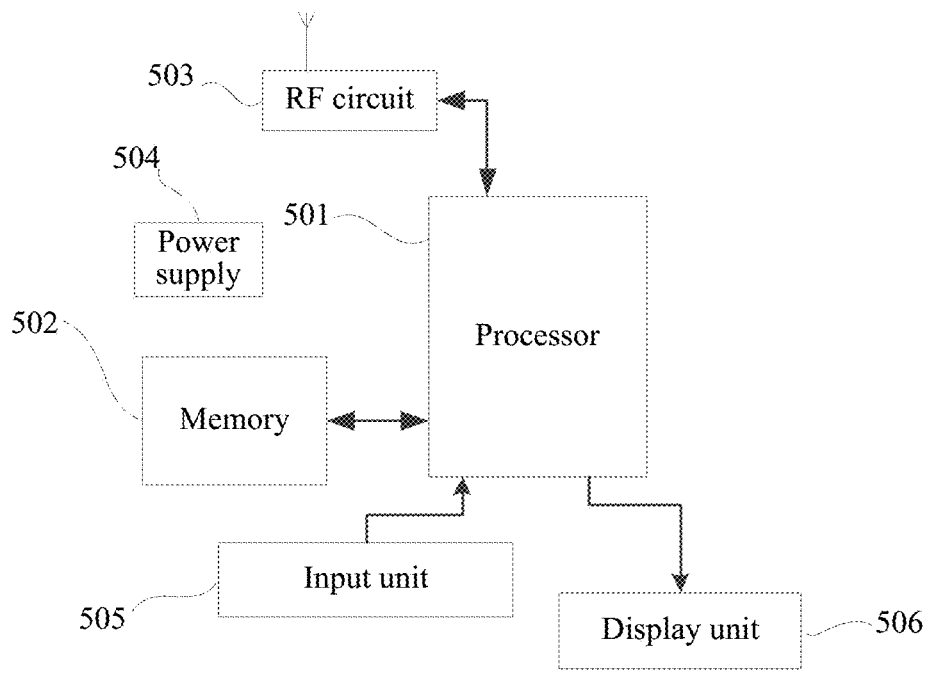
FIG. 5 is a structure diagram of a server according to an embodiment of the present application.

In addition, an embodiment of the present application further provides a server, as shown in FIG. 5, which shows a structure diagram of a server involved in this embodiment of the present application, specifically:

The server may include components such as a processor 501 with one or more processing cores, a memory 502 with one or more computer readable storage media, a radio frequency (RF) circuit 503, a power supply 504, an input unit 505, and a display unit 506. A person skilled in the art may understand that the structure of the server shown in FIG. 5 does not constitute a limitation to the server, and the server may include more components or fewer components than those shown in the figure, or some components may be combined, or a different component deployment may be used.

The processor 501 is a control center of the server, and is connected to various parts of the whole server by using various interfaces and lines. By running or executing a software program and/or module stored in the memory 502, and invoking data stored in the memory 502, the processor 501 performs various functions and data processing of the server, thereby performing overall monitoring on the server. In some embodiments, the processor 501 may include one or more processing cores. Preferably, the processor 501 may integrate an application processor and a modem. The application processor mainly processes an operating system, a user interface, an application program, and the like. The modem mainly processes wireless communication. It may be understood that the foregoing modem may also not be integrated into the processor 501.

The memory 502 may be configured to store a software program and module. The processor 501 runs the software program and module stored in the memory 502, to implement various functional applications and data processing.

The memory 502 may mainly include a program storage area and a data storage area. The program storage area may store an operating system, an application program required by at least one function (such as a sound playback function and an image display function), and the like. The data storage area may store data created according to use of the server, and the like. In addition, the memory 502 may include a high speed random access memory, and may also include a non-volatile memory such as at least one magnetic disk storage device, a flash memory, or another volatile solid-state storage device. Correspondingly, the memory 502 may further include a memory controller, so as to provide access of the processor 501 to the memory 502.

The RF circuit 503 may be configured to receive and send signals during an information receiving and sending process. Particularly, the RF circuit 1010 receives downlink information from a base station, then delivers the downlink information to one or more than one processor 501 for processing, and sends related uplink data to the base station. Generally, the RF circuit 503 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 503 may also communicate with a network and another device by wireless communication. The wireless communication may use any communications standard or protocol, which includes, but is not limited to, Global System Of Mobile Communication (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like.

The server further includes the power supply 504 (such as a battery) for supplying power to the components. Preferably, the power supply 504 may be logically connected to the processor 501 by using a power management system, thereby implementing functions such as charging, discharging and power consumption management by using the power management system. The power supply 504 may further include one or more of a direct current or alternating current power supply, a re-charging system, a power failure detection circuit, a power supply converter or inverter, a power supply state indicator, and any other components.

The server may further include an input unit 505. The input unit 505 may be configured to receive input digit or character information, and generate a keyboard, mouse, joystick, optical, or track ball signal input related to the user setting and function control. Specifically, in a specific embodiment, the input unit 505 may include a touch-sensitive surface and another input device. The touch-sensitive surface, which may also be referred to as a touch screen or a touch panel, may collect a touch operation of a user on or near the touch-sensitive surface (such as an operation of the user on or near the touch-sensitive surface by using any suitable object or accessory such as a finger or a stylus), and drive a corresponding connection apparatus according to a preset program. In some embodiments, the touch-sensitive surface may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 501. Moreover, the touch controller may receive and execute a command sent from the processor 501. In addition, the touch-sensitive surface may be a resistive, capacitive, infrared, or surface sound wave type touch-sensitive surface. In addition to the touch-sensitive surface, the input unit 505 may further include another input device. Specifically, the another input device may include, but is not limited to, one or more of a physical keyboard, a functional key (such as a volume control key or a switch key), a track ball, a mouse, and a joystick.

The server may further include a display unit 506. The display unit 506 may be configured to display information input by the user or information provided for the user, and various graphical user interfaces of the server. The graphical user interfaces may be formed by a graph, a text, an icon, a video, or any combination thereof. The display unit 506 may include a display panel. In some embodiments, the display panel may be configured by using a liquid crystal display (LCD), an organic light-emitting diode (OLED), or the like. Further, the touch-sensitive surface may cover the display panel. After detecting a touch operation on or near the touch-sensitive surface, the touch-sensitive surface transfers the touch operation to the processor 501, so as to determine the type of a touch event. Then, the processor 501 provides a corresponding visual output on the display panel according to the type of the touch event. Although, in FIG. 5, the touch-sensitive surface and the display panel are used as two separate parts to implement input and output functions, in some embodiments, the touch-sensitive surface and the display panel may be integrated to implement the input and output functions.

Although not shown in the figure, the server may further include a camera, a Bluetooth module, and the like, which are not further described herein. Specifically, in this embodiment, the processor 501 in the server loads an executable file corresponding to a process of one or more applications into the memory 502 according to a following instruction. Moreover, the processor 501 runs the application stored in the memory, thereby realizing various functions as follows:

monitoring each node in a logic unit (set); acquiring log information of a plurality of slave nodes separately when a master node is monitored to be abnormal, the log information of the slave nodes including time points of data synchronization between the slave nodes and the master node; selecting the slave node having the time point closest to current time from the plurality of slave nodes as a target node; and updating the master node to the target node.

The logic unit may be preset, and also may be established by a system according to a specific service request, i.e., the processor 501 may further realize the following functions:

acquiring a service request sent by an access gateway, selecting a plurality of nodes according to the service request, creating a logic unit according to the selected nodes, and determining a master-slave relation between the nodes in the logic unit, so that the logic unit includes a master node and a plurality of slave nodes.

In some embodiments, in order to improve the security of data, when the data in the master node is synchronized to each slave node, the data may also be backed up to other storage device, such as a distributed file system. In this way, when a node in the logic unit fails, the data in the node of the logic unit may be quickly recovered to a specified time point based on an image file on the same day and the log information of a specified time point. That is, the processor 501 may further realize the following functions:

selecting one slave node from the plurality of slave nodes as a cold slave node according to a preset strategy, and backing up data to a distributed file system in a pipeline flow manner through the cold slave node.

In some embodiments, in order to improve the security of data, off-site backup may be performed on the data in the logic unit, so that when the original logic unit is abnormal, a service of the original logic unit may be switched to a slave logic unit. That is, the processor 501 may further realize the following functions:

performing off-site backup on the logic unit to obtain a slave logic unit, and switching the service of the logic unit to the slave logic unit when the logic unit fails.

In addition, data reconstruction may also be performed on the logic unit on the site A by using the slave logic unit. That is, the processor 501 may further realize the following functions:

synchronizing data of each node in the slave logic unit to a corresponding node in the logic unit, setting the slave logic unit to be read-only when delay between data of each node in the logic unit and the slave logic unit is determined to be smaller than a preset value, and switching the service back to the logic unit when the delay is determined to be equal to 0.

The preset value may be set according to the requirement of an actual application, and is not further described herein.

From the foregoing, the server in this embodiment may monitor each node in a logic unit, and acquire log information of a plurality of slave nodes separately when a master node is monitored to be abnormal, wherein the log information of the slave nodes includes time points of data synchronization between the slave nodes and the master nodes; and then, the server selects a slave node having the time point closest to current time is selected as a target node, and updates the master node to the target node, so as to realize master-slave switchover. The logic unit in this solution may include a plurality of slave nodes, and the slave node with latest data is selected as a new master node when the master node is abnormal, so that the data consistency between the original master node and the new master node may be ensured before and after switchover. In addition, since the logic unit has only one master node, the problem of large-scale primary key conflicts in the existing technology is avoided, each device does not need to be distinguished on a service layer, the implementation is simpler, and the system availability may be greatly improved.

A person of ordinary skill in the art may understand that all or some of the steps in various methods of the foregoing embodiments may be implemented by a program instructing relevant hardware. The program may be stored in a computer readable storage medium. The storage medium may include a read only memory (ROM), a random access memory (RAM), a magnetic disk, an optical disc, or the like.

The data disaster tolerance method, device and system according to the embodiments of the present application have been described in detail above. Specific examples are used herein to illustrate the principles and implementation manners of the present application. The description of the above embodiments is only used for helping understanding the method and core idea of the present application. At the same time, changes may be made to the specific embodiments and the application scope according to the idea of the present application for a person skilled in the art. To sum up, the content of the specification should not be understood as a limitation to the present application.

What is claimed is:

1. A data disaster tolerance method, comprising:
at a computing system having one or more processors and memory:
monitoring each node in a logic unit, the nodes comprising a single master node and two or more slave nodes, wherein the single master node provides read-write service corresponding to a client-side request received by the server, and the two or more slave nodes serve as backup for the single master node;
in accordance with a determination that the master node is abnormal, acquiring log information of the plurality of two or more slave nodes separately, the log information of the two or more slave nodes comprising respective time points of data synchronization between the slave nodes and the master node;
selecting a respective slave node of the two or more slave nodes having the time point of data synchronization closest to a current time as a target node; and
updating a master-slave relationship in the logic unit, including changing a role of the target node to that of the master node.

2. The method according to claim 1, wherein monitoring each node in the logic unit includes:
periodically accessing a database instance in each node in the logic unit separately; and
determining a node to be abnormal in accordance with a determination that the database instance is unreadable and/or unwritable.

3. The method according to claim 1, wherein monitoring each node in the logic unit includes:
periodically acquiring hardware state information of each node in the logic unit and core program running state information; and
determining a node to be abnormal in accordance with a determination that the node is determined to have a hardware failure according to the hardware state information and/or in accordance with a determination that the node is determined to have a software failure according to the core program running state information.

4. The method according to claim 1, wherein monitoring each node in the logic unit includes:
registering a temporary node corresponding to the logic unit;
deleting the temporary node in accordance with a determination that the logic unit has a hardware failure and/or a core program is abnormal; and
determining the master node to be abnormal in accordance with a determination that the temporary node is detected to have disappeared.

5. The method according to claim 1, including:
before acquiring the log information of the two or more slave nodes separately:
downgrading the master node to be a new slave node in the logic unit; and
stopping an input/output interface for a synchronous log of the plurality of slave nodes.

6. The method according to claim 1, including:
in accordance with a determination that the master node is abnormal:
acquiring log information of the master node, the log information of the master node comprising a time point when the master node last updated its data; and
recovering the data on the master node according to the log information of the master node.

7. The method according to claim 1, further comprising:
performing off-site backup on the logic unit to obtain a slave logic unit;
switching a service of the logic unit to the slave logic unit in accordance with a determination that the logic unit has failed;

synchronizing data of each node in the slave logic unit to a corresponding node in the logic unit;

setting the slave logic unit to be read-only in accordance with a determination that a delay between data of each node in the logic unit and the slave logic unit is determined to be smaller than a preset value, and switching the service back to the logic unit in accordance with a determination that the delay is 0.

8. A computing system, comprising:

one or more processors;

memory; and a plurality of instructions stored in the memory, wherein the instructions, when executed by the one or more processors, cause the one or more processors to perform the following operations:

monitoring each node in a logic unit, the nodes comprising a single master node and two or more slave nodes, wherein the single master node provides read-write service corresponding to a client-side request received by the server, and the two or more slave nodes serve as backup for the single master node;

in accordance with a determination that the master node is abnormal, acquiring log information of the plurality of two or more slave nodes separately, the log information of the two or more slave nodes comprising respective time points of data synchronization between the slave nodes and the master node;

selecting a respective slave node of the two or more slave nodes having the time point of data synchronization closest to a current time as a target node; and updating a master-slave relationship in the logic unit, including changing a role of the target node to that of the master node.

9. The server according to claim 8, wherein monitoring each node in the logic unit includes:

periodically accessing a database instance in each node in the logic unit separately; and determining a node to be abnormal in accordance with a determination that the database instance is unreadable and/or unwritable.

10. The server according to claim 8, wherein monitoring each node in the logic unit includes:

periodically acquiring hardware state information of each node in the logic unit and core program running state information; and determining a node to be abnormal in accordance with a determination that the node is determined to have a hardware failure according to the hardware state information and/or in accordance with a determination that the node is determined to have a software failure according to the core program running state information.

11. The server according to claim 8, wherein monitoring each node in the logic unit includes:

registering a temporary node corresponding to the logic unit;

deleting the temporary node in accordance with a determination that the logic unit has a hardware failure and/or a core program is abnormal; and determining the master node to be abnormal in accordance with a determination that the temporary node is detected to have disappeared.

12. The server according to claim 8, wherein the operations include:

before acquiring the log information of the two or more slave nodes separately:

downgrading the master node to be a new slave node in the logic unit; and stopping an input/output interface for a synchronous log of the plurality of slave nodes.

13. The server according to claim 8, wherein the operations include:

in accordance with a determination that the master node is abnormal:

acquiring log information of the master node, the log information of the master node comprising a time point when the master node last updated its data; and recovering the data on the master node according to the log information of the master node.

14. The server according to claim 8, wherein the operations further include:

performing off-site backup on the logic unit to obtain a slave logic unit;

switching a service of the logic unit to the slave logic unit in accordance with a determination that the logic unit has failed;

synchronizing data of each node in the slave logic unit to a corresponding node in the logic unit; and setting the slave logic unit to be read-only in accordance with a determination that a delay between data of each node in the logic unit and the slave logic unit is determined to be smaller than a preset value, and switching the service back to the logic unit in accordance with a determination that the delay is 0.

15. A non-transitory computer-readable storage medium storing a plurality of instructions configured for execution by a computing system having one or more processors, wherein the plurality of instructions cause the computing system to perform the following operations:

monitoring each node in a logic unit, the nodes comprising a single master node and two or more slave nodes, wherein the single master node provides read-write service corresponding to a client-side request received by the server, and the two or more slave nodes server as backup for the single master node;

in accordance with a determination that the master node is abnormal, acquiring log information of the plurality of two or more slave nodes separately, the log information of the two or more slave nodes comprising respective time points of data synchronization between the slave nodes and the master node;

selecting a respective slave node of the two or more slave nodes having the time point of data synchronization closest to a current time as a target node; and updating a master-slave relationship in the logic unit, including changing a role of the target node to that of the master node.

16. The non-transitory computer-readable storage medium according to claim 15, wherein monitoring each node in the logic unit includes:

periodically accessing a database instance in each node in the logic unit separately; and determining a node to be abnormal in accordance with a determination that the database instance is unreadable and/or unwritable.

17. The non-transitory computer-readable storage medium according to claim 15, wherein monitoring each node in the logic unit includes:

periodically acquiring hardware state information of each node in the logic unit and core program running state information; and determining a node to be abnormal in accordance with a determination that the node is determined to have a hardware failure according to the hardware state information and/or in accordance with a determination that the node is determined to have a software failure according to the core program running state information.

18. The non-transitory computer-readable storage medium according to claim 15, wherein monitoring each node in the logic unit includes:
   registering a temporary node corresponding to the logic unit;
   deleting the temporary node in accordance with a determination that the logic unit has a hardware failure and/or a core program is abnormal; and
   determining the master node to be abnormal in accordance with a determination that the temporary node is detected to have disappeared.

19. The non-transitory computer-readable storage medium according to claim 15, wherein the operations include:
   before acquiring the log information of the two or more slave nodes separately:
      downgrading the master node to be a new slave node in the logic unit; and
      stopping an input/output interface for a synchronous log of the plurality of slave nodes.

20. The non-transitory computer-readable storage medium according to claim 15, wherein the operations include:
   in accordance with a determination that the master node is abnormal:
      acquiring log information of the master node, the log information of the master node comprising a time point when the master node last updated its data; and
      recovering the data on the master node according to the log information of the master node.

* * * * *